May 28, 1968 M. O. LAWSON ET AL 3,385,287
GAS HEATER
Filed Jan. 3, 1966 6 Sheets-Sheet 2

INVENTORS.
MAURICE O. LAWSON
GEORGE E. SCHEITLIN
CHARLES MACHALICKY
BY Trask, Jenkins & Hanley
ATTORNEYS.

INVENTORS.
MAURICE O. LAWSON
GEORGE E. SCHEITLIN
CHARLES MACHALICKY
BY
ATTORNEYS.

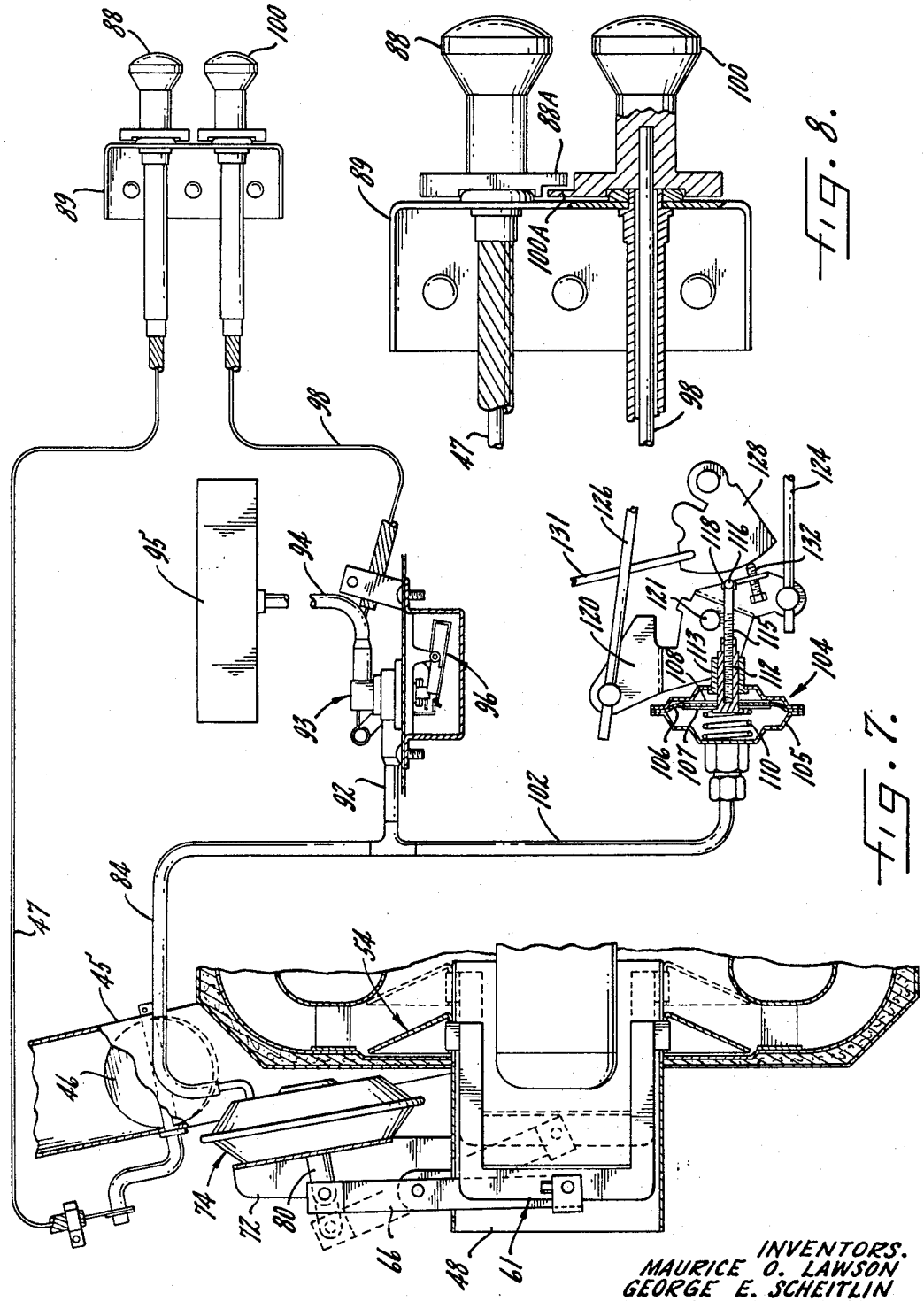

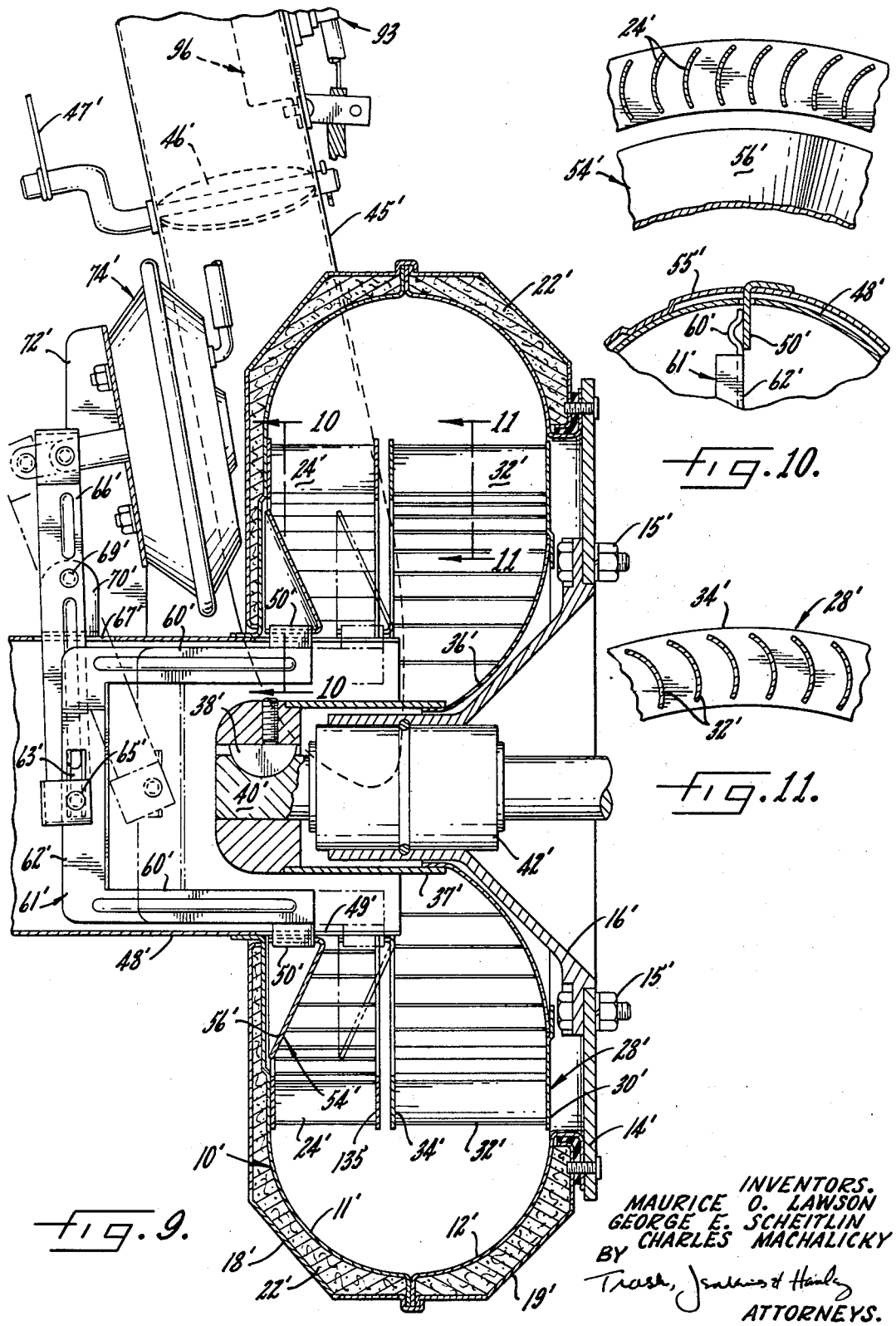

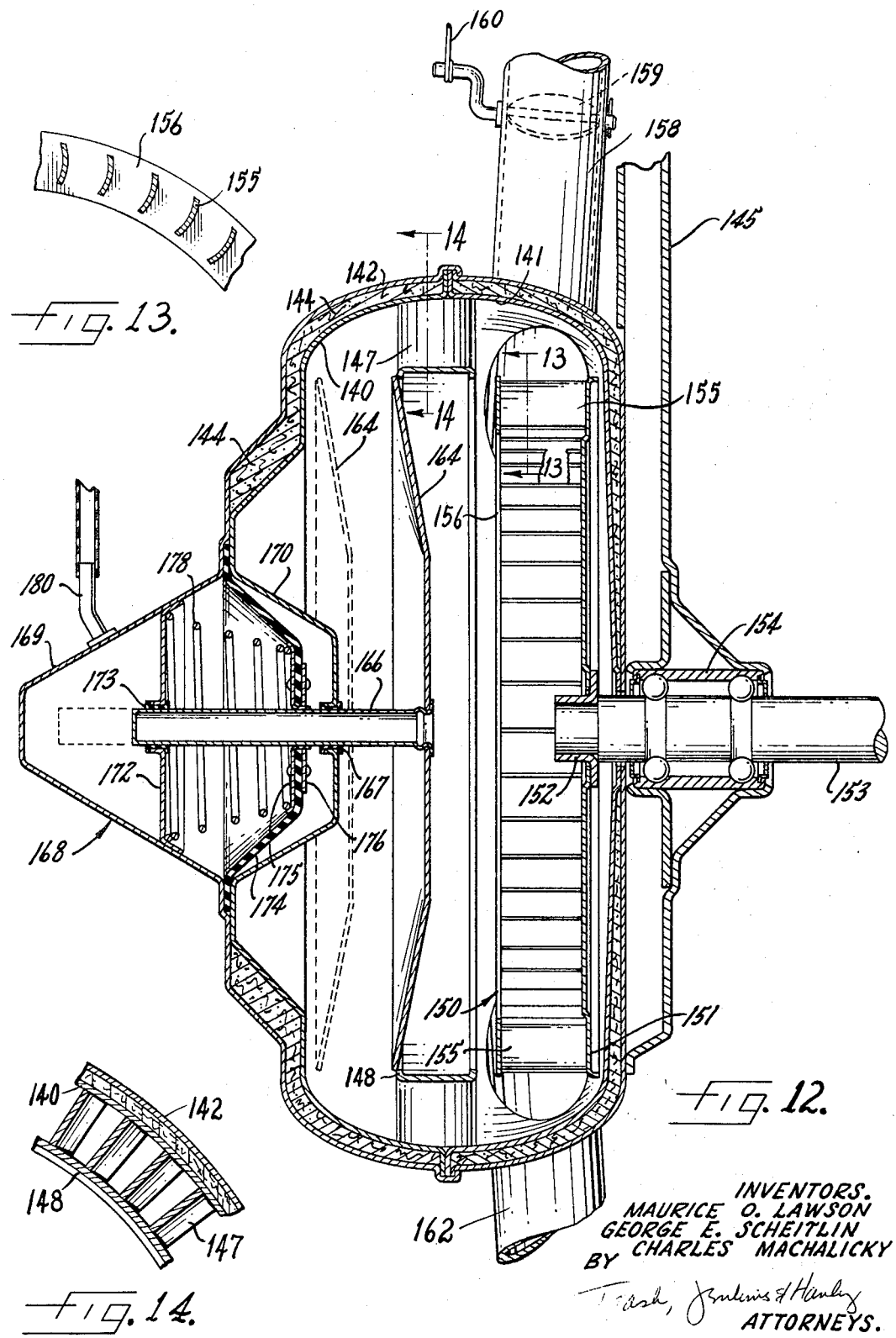

United States Patent Office 3,385,287
Patented May 28, 1968

3,385,287
GAS HEATER
Maurice O. Lawson, Dayton, Ohio, and George E. Scheitlin and Charles G. Machalicky, Columbus, Ind., said Scheitlin and said Machalicky assignors to Arvin Industries, Inc., Columbus, Ind., a corporation of Indiana
Filed Jan. 3, 1966, Ser. No. 518,483
(Filed under Rule 47(a) and 35 U.S.C. 116)
26 Claims. (Cl. 126—247)

ABSTRACT OF THE DISCLOSURE

A gas heater comprising a housing having a recirculating flow path therein. An inlet and an outlet are provided for said housing in open communication with said flow path. A rotor is mounted in the flow path and a stator is mounted in said flow path in spaced relation to said rotor whereby said rotor pulls gas into the inlet, recycles it around the flow path through the rotor and stator, and discharegs it out the outlet. A shroud is mounted in the housing for controlling the amount of gas recycled, and controls are provided for controlling the flow of gas through the inlet and outlet.

---

This invention relates to a gas heater and more particularly to improvements in a gas heater in which mechanical energy is converted into heat energy.

A gas heater of this general type has been disclosed in copending application Ser. No. 297,389, filed July 24, 1963, now U.S. Patent No. 3,245,399, issued April 12, 1966, in which gas, for example air, is heated by driving the air through a flow path by means of a rotor. The driven air passes over a plurality of stator blades in the flow path with the result that an increment of heat is added to the air during each pass through the flow path. Said header, however, requires that the rotor be driven at a relatively high speed.

It is an object of the instant invention to provide an improved gas heated for converting mechanical energy into heat energy, which will have a relatively low r.p.m. requirement, which will quickly bring the air to the desired temperature after start up, which will propel the heated air from the heater, and which can be of a compact size. It is a further object of the invention to provide a control system for such a gas heater which will control the temperature of the discharged air, and which will control the rate of flow of the air discharged from the heater.

According to one form of the invention as it is embodied in a heater for an automobile, there is provided a generally annular housing in open communication with an inlet pipe located at its axis and an outlet pipe mounted generally tangentially along its outer circumference. An annular series of stator blades are fixedly mounted within the housing and are connected at their inner ends to an annulus. A rotor connected to a suitable drive source is carried in the housing with its blades disposed on the side of the annulus opposite the stator blades. Thus, the annulus defines within the housing a generally circular flow path with the stator and rotor blades disposed on opposite sides thereof and the inlet and outlet interposed between the stator and rotor blades but on opposite sides of said flow path. The rotor blades drive the air around the flow path and discharge it out the outlet pipe.

In order to control the recycling of the air through the flow path, and thus control the amount of heat added to it, an annular shroud is carried on the inlet pipe and projects outwardly from said pipe toward the discharge side of the stator blades. The shroud is axially slidable on the inlet pipe between a closed position immediately adjacent the annulus and an open position immediately adjacent the housing wall. Movement of the shroud is effected by a linkage assembly driven by a vacuum motor operatively connected to a vacuum source, such as the intake manifold. The vacuum to the vacuum motor is controlled by a thermostat located in the discharge ducting from the heater. An air flow damper is also located in the discharge ducting from the heater for controlling the amount of heated air discharged from the heater. When the thermostat for controlling the vacuum motor is located farther downstream from the heater than the air flow damper, the controls for the thermostat and damper are operatively connected to prevent the damper from being closed without a corresponding movement of the shroud into its closed position.

Other objects and features of the invention will become apparent from the more detailed description which follows and the accompanying drawings in which:

FIG. 7 is a diagrammatic view partially in section showing the control system for the heater;

FIG. 8 is a sectional view of a modified form of the control knobs shown in FIG. 7;

FIG. 9 is a vertical section through a modified form of the gas heater shown in FIG. 1;

FIG. 10 is a vertical section taken on the line 10—10 of FIG. 9;

FIG. 11 is a vertical section taken on the line 11—11 of FIG. 9;

FIG. 12 is a vertical section through another modified form of the gas heater shown in FIG. 1;

FIG. 13 is a vertical section taken on the line 13—13 og FIG. 12, and

FIG. 14 is a vertical section taken on the line 14—14 of FIG. 12.

Figure 1:
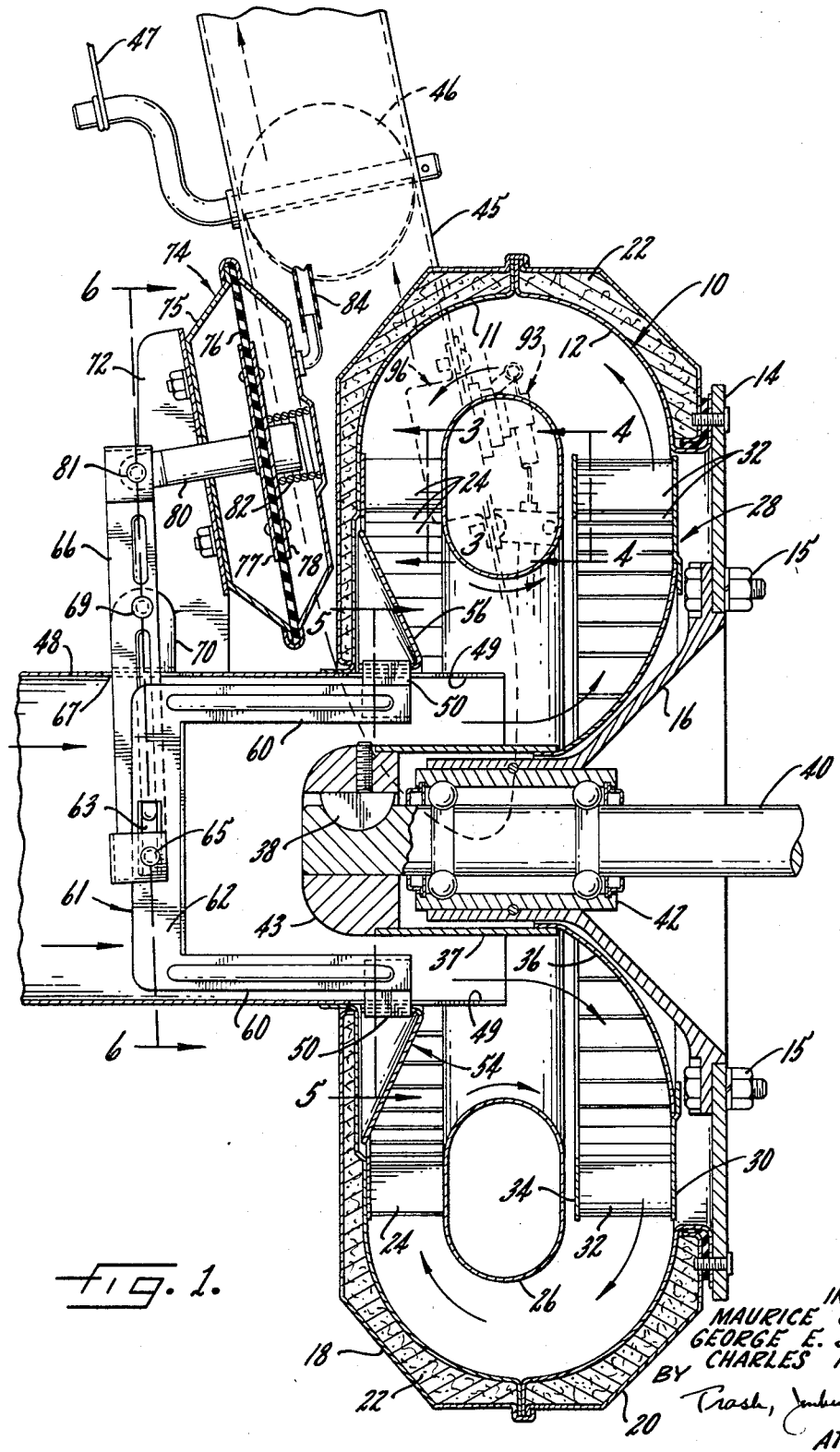
FIG. 1 is a vertical section through a gas heater embodying the invention.

In the embodiment shown in FIG. 1, the heater is provided with a generally annular housing 10 comprising a pair of opposed shells 11 and 12 interconnected at their adjacent edges. The shell 12 is connected to a mounting plate 14 for mounting the heater in the desired location. The plate 14 is bolted, as at 15, to an inwardly extending bearing support 16 extending along the housing axis. A second pair of opposed shells 18 and 20 are connected adjacent their ends to the shells 11 and 12 and are spaced therefrom throughout the remainder of their extends to define a space around the housing 10 filled with insulation 22.

Figure 2:
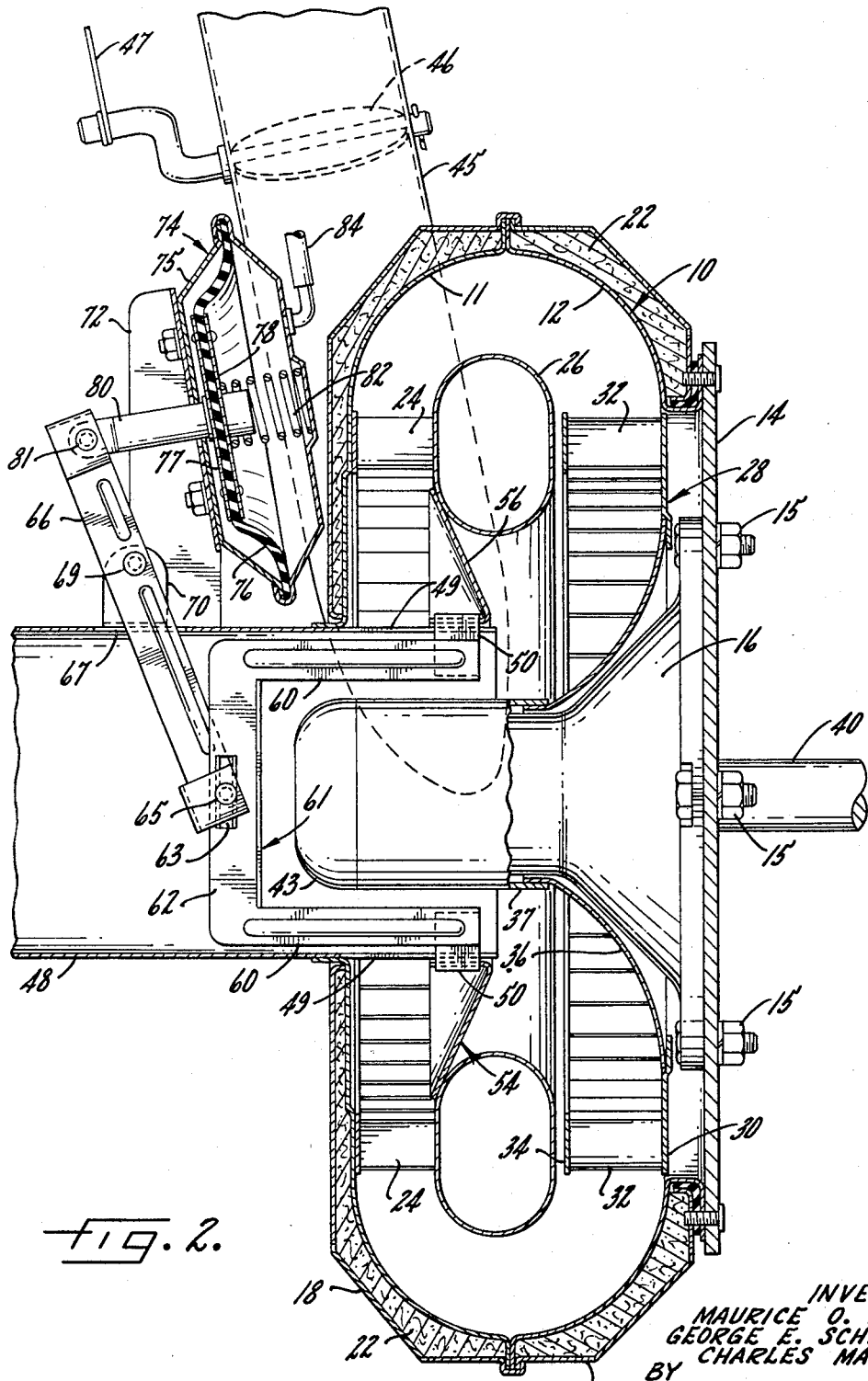
FIG. 2 is a vertical similar to FIG. 1, but showing the shroud in its closed position.
Figure 3:
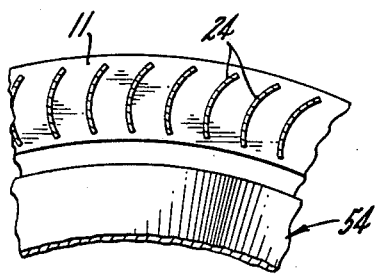
FIG. 3 is a vertical section taken along the line 3—3 of FIG. 1.
Figure 4:
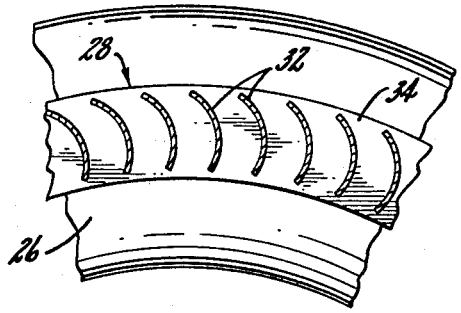
FIG. 4 is a vertical section taken along the line 4—4 of FIG. 1.
Figure 6:
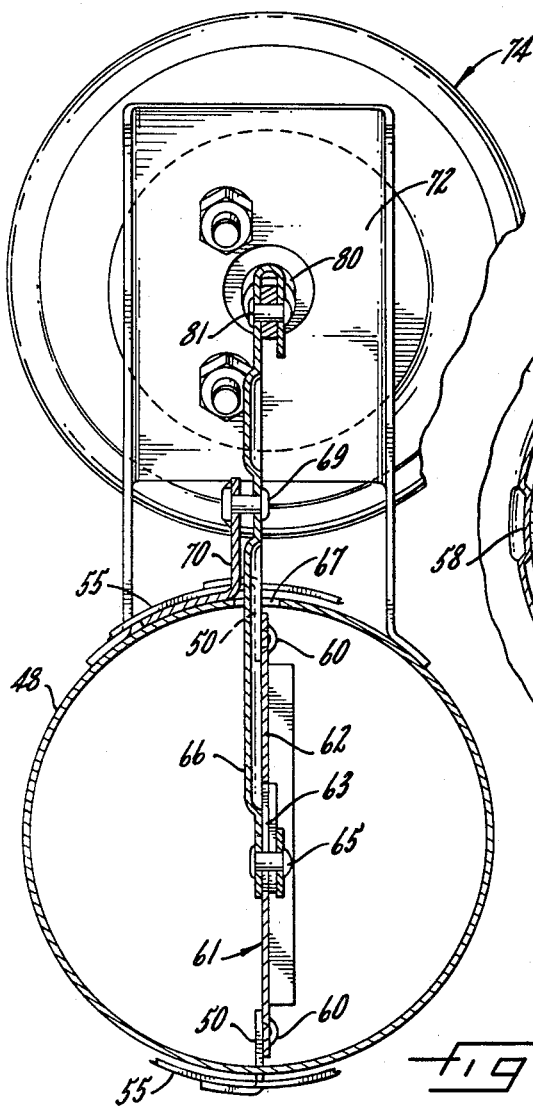
FIG. 6 is a vertical sectional taken on the line 6—6 of FIG. 1.

As shown in FIGS. 1–3 an annular series of curved stator blades 24 concentric with the housing 10 are mounted within the housing on the shell 11. The blades 24 project axially into the housing and are connected at their inner ends to an annulus 26 concentric with the housing 10 and blades 24. A rotor 28 is carried within the housing and comprises an outer ring 30 having a plurality of curved, axially extending blades 32 mounted thereon and interconnected by an inner ring 34 disposed adjacent the annulus 26. As shown in FIG. 1, the rotor blades 32 have an axial length slightly greater than the stator blades 24. A plate 36 is connected to the ring 30 and curves inwardly therefrom for connection to a hub 37 keyed, as at 38, onto a rotatable drive shaft 40 projecting outwardly through a conventional bearing assembly 42 mounted in the bearing support 16 for connection to a rotational driving unit. Conveniently, as shown in FIG. 1, the inner end of the hub 37 is rounded as at 43.

The rotor blades 32 have their concave faces presented in the direction of rotation of the rotor, and the stator blades 24 are oppositely oriented with their concave faces presented against the direction of rotation of the rotor. The annulus 26 being located adjacent the center of the housing 10 forms the center of a generally circular flow path with the stator and rotor blades being disposed within said flow path out of a common plane. Said blades may be disposed in various angular relationships around the flow path such as for example on opposite sides of said flow path as illustrated in FIG. 1.

Air exits the heater through an outlet pipe 45 in open communication with the flow path and extending tangentially outwardly from the housing 10 at its circumference for connection with the remainder of the discharge ducting. As shown in FIGS. 1 and 7, a damper in the form of a butterfly valve 46 is mounted in the pipe 45 and is controlled by a cable 47 leading to a control handle as will be more fully described hereinafter. Air is introduced into the housing through an inlet pipe 48 mounted on the housing in open communication with the flow path at the housing axis. A pair of diametrically opposed slots 49 are formed in the inner end of the pipe 48 for the reception of a pair of fingers 50 projecting inwardly from an annular shroud 54. The shroud 54 has an angulated cross-section and comprises a ring 55 (FIG. 5) concentric with the pipe 48 and terminating at its inner end in an outwardly projecting flange 56 whose outer edge lies immediately adjacent the discharge edges of the stator blades 24. A plurality of offsets 58 are formed in the ring 55 to ride against the pipe 48 and act in combination with the fingers 50 to guide the axial movements of the shroud.

Figure 5:
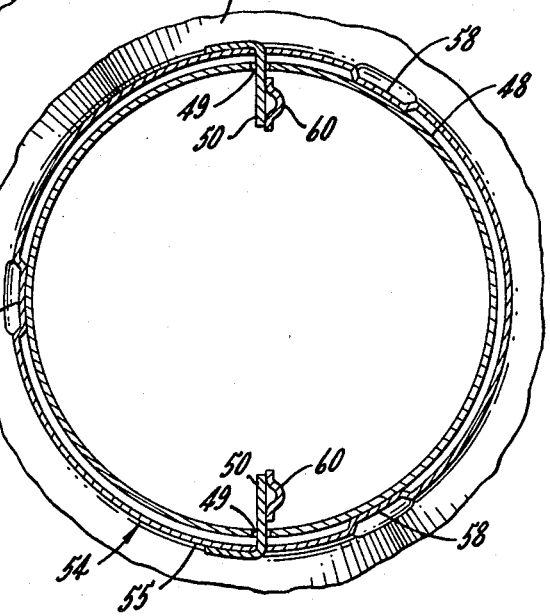
FIG. 5 is a vertical section taken along the line 5—5 of FIG. 1.

As shown in FIGS. 1 and 5, the fingers 50 are connected to the legs 60 of a C-shaped yoke 61 carried in the inlet pipe 48. The legs 60 are interconnected by a web 62 provided with an elongated slot 63. A pivot pin 65 is slidably carried in the slot 63 and is connected to one end of a lever 66 extending upwardly through a slot 67 formed in the inlet pipe to thus provide a slidable pivot axis for the lever-yoke connection. The lever 66 is swingably connected by a pin 69 to a bracket 70 mounted on the inlet pipe. A second bracket 72 is also mounted on the inlet pipe and supports a vacuum motor 74 connected to the lever 66 for effecting movement thereof to cause the shroud 54 to move axially of the housing 10.

As shown in FIG. 1, the motor 74 comprises a housing 75 in which a flexible diaphragm 76 is mounted. A pair of plates 77 and 78 are secured to the opposed faces of the diaphragm with the plate 77 being connected to an arm 80 projecting outwardly from the housing and swingably connected to the lever 66 by a pin 81. A coil spring 82 bears against the plate 78 and the housing to urge the arm 80 outwardly for moving the shroud 54 toward its closed position shown in FIG. 2. As will be described hereinafter, the housing 75 is connected to a controlled vacuum source by a conduit 84 for effecting movement of the diaphragm 76.

As the air is drawn into the housing 10 through the inlet pipe 48, it will move through the spinning rotor blades 32. The rotor blades force the air in a helical flow path around the annulus 26 and through the stator blades 24. The rotor and stator blades act on the air, and said rotor blades add an increment of energy to the air each pass around the annulus to raise its temperature. For a 140 feet per second peripheral speed rotor, the rise in temperature is about 10° F. This 10° F. temperature rise is due in part to change in momentum of the air flow. As the air moves generally tangentially from the rotor blades 32, because of their curved configuration, an angular velocity is imparted to the air and it will pass through the stator blades 24 which remove its angular velocity and provide a rotation of the air counter to the direction of rotation of the rotor.

In operation of the heater, to raise the temperature of the entering air 110° F. about ten out of eleven parts of the air entering the inlet pipe 48 are recirculated around the annulus through the rotor and stator blades. One of the eleven parts of air heated in the flow path will be permitted to be discharged through the outlet pipe 45 while the other ten parts are caused to recirculate once more and mix with one part of air drawn in through the inlet pipe 48 to repeat the cycle. The valve 46 controls the flow rate of the heated air discharged from the heater housing. With the shroud 54 in its fully open position shown in FIG. 1, the cross-sectional extent of the air flow path will be at a maximum to permit a maximum amount of air to be recirculated through the rotor to effect a maximum temperature rise of the air discharged from the housing. However, as the shroud moves axially inwardly toward the annulus 26 is reduces the cross-sectional extent of the flow path to thus cause a lesser amount of the air to be recirculated through the rotor with the result that the recirculating air will be discharged from the housing at a lower temperature. With the shroud in its fully closed position shown in FIG. 2, the flow path will be completely closed and none of the air will be recirculated so that it will exit through the pipe 45 at substantially the same temperature that it entered the housing through the pipe 48.

An automatic control assembly for the heater, as it is embodied in an automotive vehicle, is illustrated in FIG. 7. As shown, the cable 47 controlling the butterfly valve 46 in the outlet pipe 45 is connected to a control knob 88 carried in a bracket 89 mounted on the vehicle in any convenient location. The conduit 84 leading from the vacuum motor 74 is connected by a conduit 92 to a temperature responsive vacuum control regulator 93 which is described in U.S. Patent No. 2,668,014. The regulator 93 has an inlet conduit 94 which may be connected to any convenient vacuum source, such as the intake manifold 95 of an internal combustion engine. The setting of the sensor (thermostat bi-metal) 96 of the regulator is controlled by a cable 98 leading to a control knob 100 mounted on the bracket 89. The conduit 92 is connected to the conduit 84 and a conduit 102 leading to a throttle advance motor 104 by a T-connection thus placing the motors 74 and 104 and regulator 93 in operative communication with each other.

The motor 104 comprises a housing 105 having a resilient diaphragm 106 carried therein. Desirably, metal plates 107 and 108 are disposed on opposite sides of the diaphragm 106 for movement therewith. A coil spring 110 is interposed between the housing 105 and the plate 107 to urge the diaphragm 106 to the right as viewed in FIG. 7. A plunger 112 connected to the plates 107 and 108 is slidably carried in a sleeve 113 mounted on the housing 105. Said plunger is internally threaded for the reception of a threaded rod 115 extending outwardly from the plunger and having its outer end hooked, as at 116, for reception in a recess 118 in a crank 120 swingable about a pivot pin 121. The crank 120 is swingably connected at one of its ends to a link 124 leading to the automatic transmission of the vehicle and is swingably connected at its opposite end to an accelerator link 126 for thus controlling the speed of the engine. In addition to being swung about the axis of the pin 121 by movement of the rod 115, the crank 120 is also swung about the axis of said pin under the action of a cam 128 connected to the automatic choke linkage 131 and bearing against a pin 132 on the crank.

In operation of the control assembly shown in FIG. 7, the knob 38 is moved inwardly or outwardly to cause the cable 47 to move the butterfly valve 46 in the outlet pipe 45 into the desired position of adjustment for controlling the air flow outwardly from the heater. The control knob 100 is moved into the desired position to cause the cable 98 to move the bi-metal setting for the regulator 93 into the desired position for controlling the temperature of the discharged air. If the bi-metal 96 moves the regulator 93 into an open position to thus call for more heat, the open regulator 93 will thereby create a vacuum in the conduits 92, 84, and 102 and thus the throttle advance motor 104, pulling the diaphragm 106 to the left as viewed in FIG. 7 against the action of the spring 110. As the diaphragm 106 is moved to the left, it will cause the rod 115 and its hooked end 116 to swing the crank 120 clockwise as viewed in FIG. 7 to cause the accelerator link 126 to increase the engine power to prevent the heater load from stalling the engine at idle and low engine r.p.m. With the increase in vacuum in the conduit 84, the diaphragm 76 in the motor 74 will move to the right as viewed in FIG. 2 causing the lever 66 to move the shroud 54 toward its open position as shown in FIG. 1. When the desired temperature has been attained, the bi-metal 96 on the temperature control regulator 93 will cause said regulator to move toward its closed position and thereby reduce the vacuum in conduits 92, 102 and 84. With the reduction in vacuum in the conduit 102, the spring 110 in the throttle advance motor 104 will cause the rod 115 to move to the right as viewed in FIG. 7, and thus reduce the pull on the accelerator linkage and decrease engine speed. The reduction in vacuum in the conduit 84 permits the spring 82 in the motor 74 to move the arm 80 into a position to cause the lever 66 to move the shroud toward its closed position shown in FIG. 2 in full line and in dotted lines in FIG. 7. Through the regulator 93 controlled modulation of the vacuum to the throttle advance motor 104 and the stator shroud vacuum motor 74, engine stall is eliminated at idle and accurate temperature control of the discharged air is maintained.

In the control arrangement illustrated in FIGS. 1 and 7, it is assumed that the sensor for the regulator 93 is located upstream from the butterfly valve 46, that is, the bi-metal 96 is located in the outlet ducting more closely adjacent the heater than the butterfly valve 46. If it is desired to locate the bi-metal 96 downstream from the butterfly valve 46, means must be provided to prevent the butterfly valve 46, from closing without effecting a corresponding closing of the regulator 93 to prevent the air from recirculating within the heater without any means of escape. As shown in FIG. 9, when the bi-metal 96 is located downstream from the butterfly valve 46, the control knob 88 is provided with a flange 88A which overlies a flange 100A on the control knob 100 (FIG. 8). In this manner, the flanges 88A and 100A operatively interconnect the control knobs 88 and 100 so that when the knob 88 is moved into a position to close the butterfly valve 46, its flange 88A will ride against the flange 100A to move the control knob 100 to a position which will effect a simultaneous closing of the regulator 93 thereby moving the shroud 54 toward its closed position reducing the amount of recirculated air resulting in lower discharged gas temperatures.

In the heater embodiment illustrated in FIGS. 1–6, the annulus 26 is mounted adjacent the center of the housing and occupies a substantial axial extent of said housing. In certain applications, it may be desirable to eliminate the annulus 26 and thereby dispose the stator and rotor blades in closely adjacent positions. Such a modified embodiment is illustrated in FIGS. 9–11. In this embodiment the heater is provided with an annular housing 10' formed from interconnected opposed shells 11' and 12'. The shell 12' is connected to a mounting plate 14' which is bolted, as at 15', to an inwardly extending bearing support 16' extending along the housing axis. A second pair of opposed shells 18' and 19' are disposed around the shells 11' and 12' with the space between the two sets of shells being filled with insulation 22'.

An annular series of curved stator blades 24' are mounted within the housing on the shell 11' and are interconnected at their inner ends by a planar ring 135 conveniently having only a metal thickness. A rotor 28' is carried within the housing and comprises an outer ring 30' having a plurality of curved, axially extending blades 32' mounted thereon and interconnected by an inner ring 34' disposed in spaced relation to the ring 135. As shown in FIG. 9, the rotor blades 32' have an axial length slightly greater than stator blades 24'. A plate 36' is connected to the ring 30' and curves inwardly therefrom for connection to a hub 37' key, as at 38', onto a rotatable shaft 40' projecting outwardly through the bearing assembly 42' for connected to a rotational driving unit.

As with the embodiment shown in FIGS. 1–6, the rotor blades 32' have their concave faces presented in the direction of rotation of the rotor, and the stator blades 24' are oppositely oriented with their convex faces presented in the direction of rotor movement. The ring 135 being located adjacent the center of the housing 10' forms the center of a generally circular flow path with the stator and rotor blades being disposed in non-planar relationship but in axial alignment with each other.

The air inlet and discharge ducting and controls for the embodiment shown in FIGS. 9–11 are exactly the same as in the embodiment shown in FIG. 1. To this end, the air is discharged through the outlet pipe 45' mounted tangentially on the housing 10' at its circumference and provided with a butterfly valve 46' controlled by a cable 47'. The air enters the housing through an inlet pipe 48' on the housing axis. The inlet pipe is provided with slots 49' for the reception of fingers 50' on the annular shroud 54'. The shroud 54', which has an angulated cross-section, comprises a ring 55' concentric with the pipe 48' and terminating at its inner end in an outwardly projecting flange 56' whose outer edge lies immediately adjacent the discharge edges of the stator blades 24'. The fingers 50' are connected to the legs 60' of a C-shaped yoke 61' carried in the inlet pipe 48'. The yoke web 62' has an elongated slot 63' in which a pivot pin 65' connected to a lever 66' is slidably carried. The lever 66' projects upward through a slot 67' in the inlet pipe, and said lever is swingably connected by a pin 69' to a bracket 70' mounted on the inlet pipe. A second bracket 72' is also mounted on the inlet pipe to support the vacuum motor 74' connected to the lever 66' for effecting movement thereof to cause the shroud 54' to move axially of the housing 10'.

The mtor 74' is identical in its construction and operation to the motor 74. The control assembly shown in FIG. 7 can be employed with the heater illustrated in the embodiment shown in FIGS. 9–11 in the same manner as it can be employed with the heater shown in the embodiment illustrated in FIGS. 1–6. With the FIG. 7 control assembly employed in combination with the heater shown in FIG. 9, the control knob 88 is connected to the butterfly valve cable 47' and the regulator 93 and motor 106 are connected to the motor 74' through the vacuum conduit 84. As with the other embodiment, if the bi-metal 96 is located downstream of the butterfly valve 46, the control knobs 88 and 100 are operatively interconnected as by the flanges 88A and 100A.

In the embodiment of a heater shown in FIGS. 12–14, the heater housing is formed from a pair of opposed interconnected shells 140 and 141. A second pair of opposed shells 142 and 143 are interconnected around the shells 140 and 141 with the space between the two sets of shells being filled with insulation 144. As shown, the shell 143 may be connected to a mounting plate assembly 145 for mounting the heater in any desired location.

An annular series of curved stator blades 147 are mounted within the housing, as on one of the shells 140 and 141, and project into said housing with their inner ends connected to a ring 148. A rotor 150 is carried within the housing and comprises an outer ring 151 connected to a hub 152 mounted on a shaft 153 projecting outwardly from the housing through a conventional bearing assembly 154 for connection to a suitable drive unit. A plurality of curved rotor blades 155 are mounted on the ring 151 and project inwardly therefrom with their inner ends being connected to an inner ring 156.

The rotor blades 155 have their concave faces presented in the direction of rotation of the rotor, and the stator blades 147 are oriented with their convex faces presented in the direction of rotor rotation. Thus, with the stator blades displaced 90° from the rotor blades, such as is shown in FIG. 12, the convex faces of the stator blades will be presented forwardly as viewed in FIG. 12. The ring 148, being located adjacent the center of the housing, forms the center of a generally circular flow path with the stator and rotor blades being disposed within said flow path.

Air exits the heater through an outlet pipe 158 in open communication with the flow path adjacent the leading edge of the stator and extending generally tangentially outwardly from the housing at its circumference for connection with the remainder of the discharge ducting. A damper in the form of a butterfly valve 159 is mounted in the pipe 158 and is controlled by a cable 160 leading to a control knob in the same manner as the cable and control knob assembly shown in FIG. 7.

Air is introduced into the housing through an inlet pipe 162 mounted on the circumference of the housing and in open communication with the flow path between the stator and rotor. The recycling of the air within the flow path is controlled by a circular shroud 164 movable between an open position shown in dotted lines in FIG. 12 in which it is positioned against the housing shell 140 and the air is free to recycle around the flow path and a closed position shown in full lines in FIG. 12 in which it is positioned against the ring 148 to prevent recycling of air around the flow path. The shroud is supported on a shaft 166 projecting axially outwardly through a bearing 167 mounted in an opening in the housing 140. The shaft 166 is connected to a vacuum motor 168 corresponding to the motors 74 and 74'. The outer wall of the motor 168 is formed by an enlargement 169 formed in the shell 142 and its inner wall is formed by an enlargement 170 formed in the shell 140, the shell 170 having an opening therein for supporting the shaft bearin 167. An apertured guide plate 172 is mounted in the motor 168 and is provided with a bearing 173 which slidably supports the outer end of the shaft 166. A diaphragm 174 is mounted in the motor and has a pair of plates 175 and 176 mounted on its opposed faces, the plate 175 being fixedly connected to the shaft 166. The diaphragm, and thus the shroud, are biased to the right as viewed in FIG. 12 by a coil spring 178 interposed between the plates 172 and 175. A nipple 180 is mounted on the motor 168 and is adapted to be connected to a vacuum conduit, as the conduit 84 shown in the control assembly in FIG. 7, for actuating said motor by the control assembly shown in FIG. 7.

While each of the shrouds 54, 54' and 164 has been described as being moved by a vacuum motor 74, 74' and 168 actuated by the vacuum control system shown in FIG. 7, it is to be understood, however, that a completely manually controlled shroud actuation can be employed. Where such manual operation is employed, the control wire 98, which leads to the regulator 93 in the control system shown in FIG. 7, is connected directly to the lever 66 in FIG. 1, the lever 66' in FIG. 9, and the shroud shaft 166 in FIG. 12. In this manual operation, the regulator 93 and motor 104 and their associated vacuum conduits will, of course, be eliminated.

In each of the embodiments illustrated, the gas inlet duct will always be in open communication with the gas outlet duct through the rotor irrespective of the positioning of the shroud within the housing. In this manner, the shroud can be in its fully closed position and the rotor will still be effective to blow gas at generally ambient temperature from the heater through the heater outlet.

While the instant invention has been described as being employed as a heater for an automotive vehicle, it is to be understood, of course, that said heater is adapted for producing heat for any desired structure.

We claim:

1. In a gas heater, a generally annular housing having a generally annular flow path with a generally annular cross-section throughout its extent, means spaced from said housing and forming the center of said flow path, a plurality of stator blades in said housing at one side of said flow path, a rotor carried in said housing and having a plurality of blades in axially spaced relation to stator blades on the opposite side of said flow path, an inlet in said housing in communication with said flow path on one side of said stator and rotor blades, an outlet in said housing in communication with said flow path on the side of said stator and rotor blades remote from said inlet, and means for controlling gas flow into and out of said inlet and outlet, respectively.

2. The invention as set forth in claim 1 in which said stator blades comprise an annular series of blades having their outer ends connected to said housing, and said means forming the center of the flow path comprises a ring connected to the inner ends of said stator blades, said stator blades and ring being concentric with said housing.

3. The invention as set forth in claim 2 in which said ring comprises an annular member extending axially outwardly from said stator blades toward said rotor blades.

4. The invention as set forth in claim 2 in which said ring comprises an annular strip of material.

5. The invention as set forth in claim 1 in which said rotor blades are curved with their concave faces presented toward the direction of rotor rotation and said stator blades are oppositely curved from the rotor blades, said rotor blades having a greater axial extent than said stator blades.

6. In a gas heater, a generally annular housing having a generally annular flow path with a generally annular cross-section throughout its extent, a plurality of stator blades in said housing at one side of said flow path, a rotor carried in said housing and having a plurality of blades in axially spaced relation to said stator blades on the opposite side of said flow path, said stator and rotor blades being disposed in concentric axially spaced planes, an inlet and an outlet in said housing in communication with said flow path and means for controlling gas flow through at least one of said inlet and outlet.

7. In a gas heater, a generally annular housing having a generally annular flow path with a generally annular cross-section throughout its extent, a plurality of stator blades in said housing in said flow path, a rotor carried in said housing and having a plurality of blades in said flow path in non-planar relation to said stator blades, an inlet adjacent the axis of said housing in communication with said flow path between said stator and rotor blades, an outlet adjacent the circumference of said housing in open communication with said flow path on the side of said flow path remote from said inlet, and means for controlling gas flow through at elast one of said inlet and outlet.

8. The invention as set forth in claim 7 in which said rotor is curved axially toward said inlet radially inwardly of the rotor blades.

9. In a gas heater, a generally annular housing having a generally annular flow path with a generally annular cross-section throughout its extent, a plurality of stator blades in said housing in said flow path, a rotor carried in said housing and having a plurality of blades in said flow path in non-planar relation to said stator blades an inlet and an outlet at the circumference of said housing in communication with said flow path, and means for controlling gas flow through at least one of said inlet and outlet.

10. In a gas heater, a housing maving a generally annular flow path with a generally annular cross-section throughout its extent, a plurality of stator blades in said housing and having a plurality of blades in said flow path in non-planar relation to said stator blades, an inlet and an outlet at the circumference of said housing in communication with said flow path, and means for controlling gas flow through at least one of said inlet and outlet.

10. In a gas heater, a housing having a generally annular flow path with a generally annular cross-section throughout its extent, means spaced from the housing and forming the center of the flow path in said housing, a plurality of stator blades in said housing in said flow path, a rotor carried in said housing and having a plurality of blades in said flow path in non-planar relation to said stator blades, an inlet and an outlet in said housing in communication with said flow path, and means for controlling gas flow through at least one of said inlet and outlet.

11. In a gas heater, a housing having a generally annular flow path therein, a series of stator blades in said housing in said flow path, a rotor carried in said housing having a series of blades in said flow in non-planar relation to said stator blades, an inlet and an outlet in said housing in open communication with said flow path, a shroud, means movably supporting said shroud in said flow path and between said inlet and stator blades in the direction of gas flow in said flow path, and means for moving said shroud across said flow path to control the amount of gas recirculating in said flow path without blocking gas flow from said inlet to said rotor to said outlet.

12. In a gas heater, a housing having a generally annular flow path therein a series of stator blades in said housing at one side of said flow path, a rotor carried in said housing having an annular series of blades spaced from said stator blades adjacent the opposite side of said flow path, an inlet in said housing adjacent the axis thereof, an outlet in said housing adjacent the circumference thereof, and a shroud interposed between said inlet and stator blades in said flow path and axially movable along the length of said stator blades.

13. In a gas heater, a generally annular housing having a generally annular flow path therein, an annular series of stator blades in said flow path, a rotor carried in said housing having an annular series of blades in said flow path, an inlet pipe extending axially into said housing along the axis thereof, an outlet pipe extending outwardly from the circumference of said housing, and an annular shroud slidably carried on said inlet pipe and axially movable across said flow path to prevent recycling of gas therearound.

14. The invention as set forth in claim 13 in which the outer circumference of said shroud is disposed immediately adjacent said stator blades.

15. In a gas heater, a generally annular housing having a generally annular flow path therein, an annular series of stator blades in said housing in said flow path, a rotor carried in said housing having an annular series of blades in said flow path, an inlet pipe extending axially into said housing along the axis thereof, an outlet pipe extending outwardly from the circumference of said housing, an annular shroud slidably carried on said inlet pipe and projecting radially outwardly therefrom, link means operatively connected to said shroud, and power means connected to said link means to cause said link means to move said shroud axially within said housing across said flow path to prevent recycling of gas thereround.

16. The invention as set forth in claim 15 with the addition that said shroud and inlet pipe are provided with guide means for guiding the movements of said shroud on said inlet pipe.

17. The invention as set forth in claim 15 in which said link means comprises a yoke connected to said shroud, and a link swingably connected to said yolk on a slidable first axis and swingably connected to said power means on a second axis.

18. The invention as set forth in claim 17 in which said yoke is carried within said inlet pipe and said link is swingably supported on a bracket mounted on said inlet pipe and projects through a slot formed therein for connection to said yoke.

19. In a gas heater, a generally annular housing having a generally annular flow path, means forming the center of the flow path in said housing, an annular series of stator blades in said housing in said flow path extending between said means and housing, a rotor carried in said housing having an annular series of blades in said flow path, an inlet and an outlet at the circumference of said housing in communication with said flow path said rotor, inlet and outlet being disposed on the same side of said flow path with respect to said stator, and a shroud mounted in said housing and movable between an open position spaced from said means whereby gas can recycle around said flow path and a closed position against said means whereby said shroud prevents recycling of gas around said flow path without blocking gas flow from said inlet to said rotor to said outlet.

20. In a gas heater, a housing having a flow path therein, a plurality of stator blades in said housing in said flow path, a rotor carried in said housing and having a plurality of blades in said flow path, inlet duct means in open communication with said flow path for the introduction of gas thereto, outlet duct means in open communication with said flow path for the exit of gas therefrom, a valve in said outlet duct means for controlling the gas flow rate from said housing, a shroud adjustably movable in said housing for controlling the recycling of gas through said flow path, first control means for controlling the positioning of said valve, temperature sensing means operatively connected to said shroud for controlling the positioning of said shroud, and second control means for adjusting the actuation of said temperature sensing means.

21. The invention as set forth in claim 20 in which said temperature sensing means is positioned in said outlet duct means upstream toward the heater from said valve and said first and second control means are independently operable.

22. The invention as set forth in claim 21 in which said temperature sensing means is positioned in said outlet duct means downstream from the heater from said valve, and said first and second control means are operatively interconnected for simultaneously controlling said valve and temperature sensing means.

23. In a gas heater, a housing having a flow path therein, a plurality of stator blades in said housing in said flow path, a rotor carried in said housing and having a plurality of blades in said flow path, inlet duct means in open communication with said flow path for the introduction of gas thereto, outlet duct means in open communication with said flow path for the exit of gas therefrom, a valve in said outlet duct means for controlling the gas flow rate from said housing, first control means for controlling the positioning of said valve, a shroud adjustably movable in said housing for controlling the recycling of gas through said flow path, motor means operatively connected to the shroud for moving said shroud in said housing, temperature sensing means operatively connected to said motor means and to a power source for said motor, and second control means for adjusting the actuation of said temperature sensing means.

24. In a gas heater, a housing having a flow path therein, a plurality of stator blads in said housing in said flow path, a rotor carried in said housing and having a plurality of blades in said flow path, inlet duct means in open communication with said flow path for the introduction of gas thereto, outlet duct means in open communication with said flow path for the exit of gas therefrom, a valve in said outlet duct means for controlling the gas flow rate from said housing, first control means for controlling the position of said valve, a shroud adjustably movable in said housing for controlling the recycling of gas through said flow path, a vacuum motor operatively connected to the shroud for moving said shroud in said housing, a temperature actuated vacuum regulator connected to said vacuum motor and a vacuum source for regulating the vacuum to said vacuum motor, and second control means for adjusting the actuation temperature of said vacuum regulator.

25. In a gas heater for an automotive vehicle, a housing having a flow path therein, a plurality of stator blades in said housing in said flow path, a rotor carried in said housing and having a plurality of blades in said flow path, inlet duct means in open communication with said flow path for the introduction of gas thereto, outlet duct means in open communication with said flow path for the exit of gas therefrom, a valve in said outlet duct means for controlling the gas flow rate from said housing, first control means for controlling the positioning of said valve, a shroud adjustably movable in said housing for controlling the recycling of gas through said flow path, a vacuum motor operatively connected to the shroud for moving said shroud in the housing, said vehicle having an engine provided with an intake manifold and an accelerator linkage for said engine, a temperature actuated vacuum control regulator connected to said vacuum motor and the vehicle engine intake manifold, means connected to the vacuum regulator and the vehicle accelerator linkage for increasing the engine speed upon actuation of said vacuum regulator to maintain a predetermined engine speed, and second control means for adjusting the actuation temperature of said vacuum regulator.

26. In a gas heater, a housing, a plurality of stator blades mounted therein, a rotor carried in said housing having a plurality of blades in non-planar relationship with said stator blades, an inlet and outlet in open communication with the interior of said housing, a valve in said outlet for controlling the gas flow rate from the housing, a shroud adjustably movable in said housing for controlling recycling gas flow through said stator and rotor blades, first control means for controlling the positioning of said valve, and second control means for controlling the movements of said shroud, said first and second control means being operatively interconnected to prevent closing said valve without movement of said shroud into a closed position preventing recycling gas flow through said stator and rotor blades.

References Cited
UNITED STATES PATENTS 2,537,800    1/1951    Stoeckly.
3,245,399    4/1966    Lawson _____ 126—247

CHARLES J. MYHRE, *Primary Examiner.*

UNITED STATES PATENT OFFICE
CERTIFICATE OF CORRECTION

Patent No. 3,385,287                                      May 28, 1968

Maurice O. Lawson et al.

It is certified that error appears in the above identified patent and that said Letters Patent are hereby corrected as shown below:

Column 1, line 41, "heated" should read -- heater --. Column 2, line 23, after "vertical" insert -- section --; line 46, "og" should read -- of --. Column 8, line 64, "elast" should read -- least --. Column 9, lines 13 to 23, beginning with "10. In a gas heater" cancel all to and including "and outlet." in line 23, same column 9; line 27, after "flow" insert -- path --.

Signed and sealed this 30th day of December 1969.

(SEAL)
Attest:

Edward M. Fletcher, Jr.                           WILLIAM E. SCHUYLER, JR.
Attesting Officer                                         Commissioner of Patents